Feb. 19, 1946.   T. C. REESE   2,395,013
TIRE CHAIN APPLYING DEVICE
Filed March 18, 1943   2 Sheets-Sheet 1

WITNESSES:
George F. Caldwell

INVENTOR
THOMAS C. REESE
BY
ATTORNEY

Feb. 19, 1946. T. C. REESE 2,395,013
TIRE CHAIN APPLYING DEVICE
Filed March 18, 1943 2 Sheets-Sheet 2
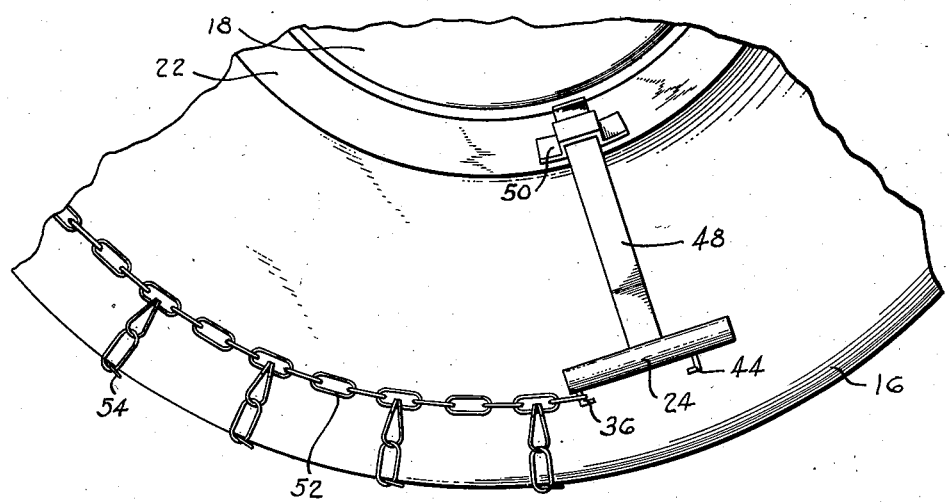
Fig. 5
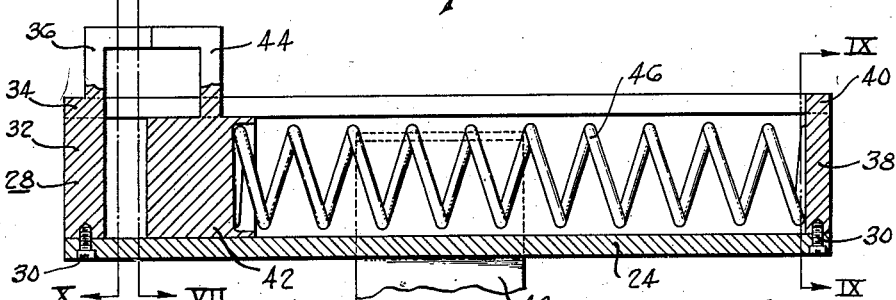
Fig. 6
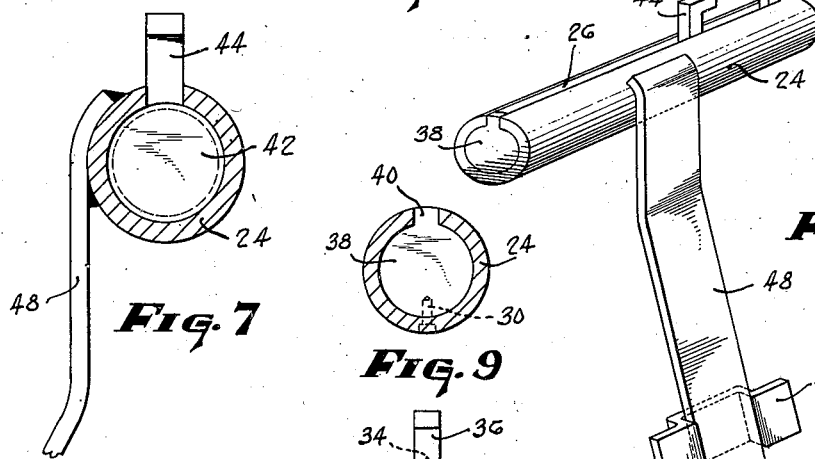
Fig. 8
Fig. 7
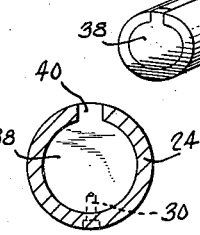
Fig. 9
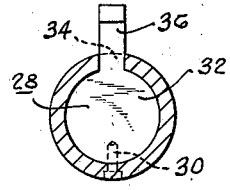
Fig. 10
WITNESSES:
george f. Caldwell
INVENTOR
THOMAS C. REESE
BY Louis Necko
ATTORNEY Patented Feb. 19, 1946

2,395,013

UNITED STATES PATENT OFFICE 2,395,013

TIRE CHAIN APPLYING DEVICE

Thomas C. Reese, Ardmore, Pa.

Application March 18, 1943, Serial No. 479,676

5 Claims. (Cl. 152—216)

My invention relates to a tire chain applying device by means of which an anti-skid chain may be applied to or removed from the tire of a vehicle without the necessity of jacking up the vehicle and without any special skill or effort.

In the interest of streamlining and to improve appearance, automobiles are provided with wide, low hanging mud guards or fenders, thus making the tires altogether inaccessible except for the portion of the tire lying between the bottom rear edge of the rear fender and the ground. It is, therefore, an object of my invention to provide a device by which a chain may be easily and conveniently applied despite the limited space available.

Another object of my invention is to produce a simple and easily manufactured device of the character set forth and one which will be universally applicable to all types of vehicles.

The full nature of the invention, the structure of the invention, the method of its operation and the objects which are attained thereby will be more clearly understood from the following specification and the accompanying drawings in which:

Fig. 5 is an enlargement of the lowermost portion of Fig. 3 showing details of construction;

Fig. 6 is an enlarged longitudinal section through the applying device;

Fig. 7 is a section on line VII—VII of Fig. 6;

Fig. 8 is a perspective view of the applying device shown detached;

Fig. 9 is a section, on a reduced scale, taken on the line IX—IX of Fig. 6; and, Fig. 10 is a section, on a reduced scale, taken on line X—X of Fig. 6.

Figure 1:
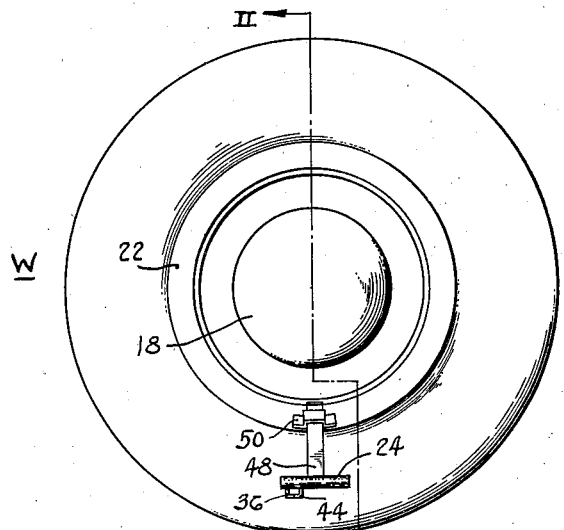
Fig. 1 is a side elevation of an automobile tire provided with a tire chain applying device embodying my invention.

Referring to the drawings, I show a wheel "W" which is illustrated as a disc-type wheel and which includes a body 12 supporting a felloe 14 on which is mounted a pneumatic tire 16 in the well-known manner. The wheel is also provided on the outboard side with the usual dust cap 18.

While I have shown a disc-type wheel, it is to be understood that the type of wheel used does not affect my invention in any way. This is important because a tire applying device which is structurally or functionally tied in with any specific form of wheel will be limited to use with that type of wheel and if the style or structure of the wheel is changed, as from a spoke to a disc wheel, the chain applying device becomes altogether obsolete. See for example, the Harris Patent No. 1,153,490, of September 14, 1915.

As far as I can now foresee, and as long as pneumatic tires are used, they will necessarily be supported by some form of a rim or felloe 14 which will be carried by or will form a part of the wheel structure. Such rim or felloe usually includes stepped or curved inboard and outboard side walls 20 and 22 which form a seat for the inner open end of the tire. It is, therefore, a main object of my invention to produce an applying device which is carried by the side walls 20 and 22 so as to be altogether independent of the remaining wheel structure.

To this end, I have devised the structure best shown in Figs. 6 to 10 and which includes a channel member or sleeve 24 which is provided with an upper slot 26. One end of the channel 24 is closed by a combination plug and engaging or hook member 28 which may be welded, wedged or otherwise secured in position as by a set screw 30. The member 28 includes a body portion 32 which closes the end of the channel, a reduced portion 34 which plugs the end of the slot 26 and the engaging member or hook 36. The other end of the channel 24 is likewise suitably closed as by a plug 38 having an upper reduced portion 40 which closes the corresponding end of the slot 26. Within the channel 24 is slidably mounted another engaging member 42 having a hook 44. The body of the member 42 is somewhat elongated so as to prevent tilting of the arm 44. The member 42 is biased toward the member 28 by a spring 46.

Figure 2:
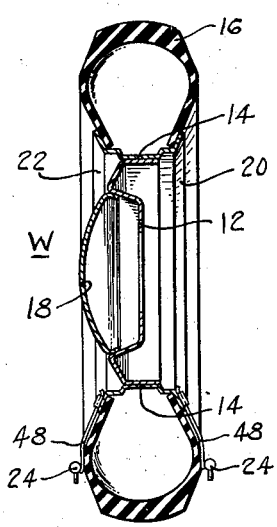
Fig. 2 is a section on line II—II of Fig. 1.

The channel 24 is carried by an arm 48 which is adapted to engage a bracket 50 suitably secured to a side wall 20 or 22 of the rim 14. The arm 48 is so bent or shaped and is of such length as to conform to the contour of the side walls 20 and 22 and to position the channel 24 alongside the tire at approximately the path of the side chains 52 of which support the cross links 54 of an anti-skid chain. This position is clearly shown in Fig. 5. The channel member 24 may be straight, or if desired, it may be bent on a radius corresponding to the radius of the curvature of the side chains 52 when the latter are in position on the tire. Likewise, the bracket 50 may be omitted and an opening provided in the body of the wheel or in the side wall of the rim for detachably engaging the arm 48. As will be seen from Fig. 2, a pair of devices is used for each rear wheel, one applying device being on the inboard and the other on the outboard side of the wheel.

Operation

Figure 3:
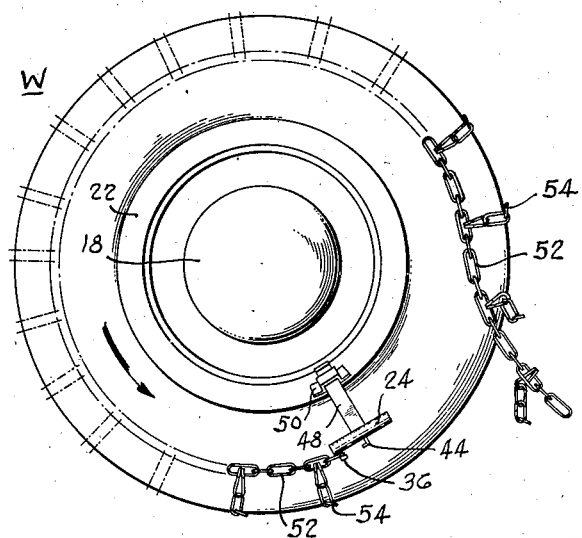
Fig. 3 is a view similar to Fig. 1 illustrating the manner of applying an anti-skid chain to a tire.
Figure 4:
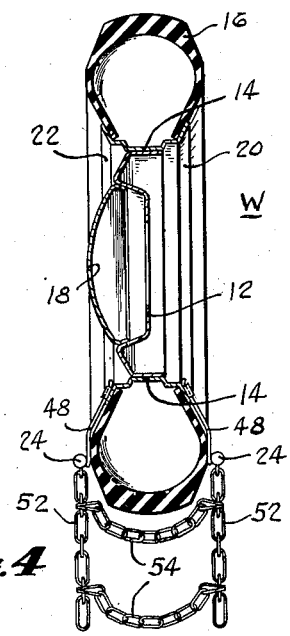
Fig. 4 is a vertical view also illustrating the manner of applying a chain to a tire.

When it is desired to apply anti-skid chains, the car is moved until the brackets 50 (or their equivalent) on the rim 24 are disposed below the bottom edge of the rear fender. The operator then takes a pair of the devices shown in Fig. 8 and inserts the arms 48 thereof in the inboard and outboard brackets 50. The movable hook 44 of first one bracket, then the other, is pulled away from the corresponding fixed hook 36 and the end link of one side chain 52 and then the other, is engaged with the fixed hook 36. Upon the hook 44 being released, the spring 46 biases it toward and into contact with the fixed hook 36, as shown in Fig. 6. When the chains for both rear wheels have been thus applied, the car is again moved so as to turn the wheels through an almost complete revolution in the direction of the arrow in Fig. 3. The frictional engagement of the arms 48 with the brackets 50 prevent the arms 48 from falling out while the wheels are being turned. The opposite ends of the chain being fastened to the inboard and outboard sides of the wheel causes the chain to drape itself on the tire 16 while the wheel is moving through one revolution and the chain now assumes the position diagrammatically illustrated in Figs. 3 and 4. With the channel 24 now again disposed just below the bottom edge of the rear fender where it is readily accessible, the end links of the opposite ends of the side chains are disposed near the opposite ends of the channels 24. The operator now pulls out one and then the other of the hooks 44, to meet the end links of the side chains 52 and engages the end links with the hooks 44. The springs 46 again bias the members 42 toward the members 28. The vehicle is then driven off and as it moves the anti-skid chains adjust themselves so that the hooks 44 and 36, due to the action of the springs 46 are again in closed, or substantially closed, position as shown in Fig. 6. When it is desired to remove the chains, the wheels are again brought to the position in which the channels 24 are accessible and the hooks 44 are pulled outwardly to permit disengagement of the end links on one end of the side chains 52. The car is again moved until the wheels make one revolution. This causes the chains to fall off the tire and the end links of the side chains 52 on the opposite end of the chain are now disengaged. The car is now again moved until the wheels clear the chains which can now be picked up. The arms 48 are disengaged from the brackets 50 and stored away with the chains. It will be noted that the snap or toggle connector links which are hard to open and close and which are now standard on anti-skid chains are dispensed with, thus reducing the cost of the chain itself. Furthermore, a chain equipped with the standard connector links is the exact size of the tire, it is difficult to close the snap links, as any one who has had experience will know. If the chains are too big, the snap link connectors can not take up the slack. By my device, the movable link 44 is pulled out and the near link of the side chain 52 is hooked into it and by the action of the spring 46, the chain is tightened. Any excess links remaining at the ends of the side chains can be tucked in or engaged by the spreaders.

What I claim is:

1. A tire chain applying device comprising, an elongated member, a pair of complementary, juxtaposed hooks carried by said member and adapted, when abutting each other, to form a closed loop, at least one of said hooks being slidably carried by said elongated member and being movable away from the other of said hooks, and means for securing said device to the wheel of a vehicle with said elongated member lying against and parallel to the side wall of the tire at a point between the rim of the wheel and the tread of the tire.

2. The structure recited in claim 1 together with means yieldably urging said movable hook into abutment against the other of said hooks for retaining said hooks in their normal, closed loop forming position.

3. The structure recited in claim 1 in which said elongated member is of a cylindrical cross section with the movable hook slidable therein, together with resilient means enclosed in said elongated member and urging said slidable hook against the other of said hooks for yieldably retaining said hooks in their normal closed loop forming position.

4. The structure recited in claim 1 in which said means includes an arm secured to said elongated arm, and an apertured bracket secured to said wheel and adapted to receive and retain said arm, said arm being so formed as to conform to the contour of that portion of the wheel between said bracket and the position of said elongated member.

5. A tire chain applying device comprising, an elongated member, a pair of complementary juxtaposed hooks carried by said member, each having a deflected portion facing a similarly and oppositely deflected portion on the other of said hooks, whereby said hooks, when in abutment, form a closed loop adapted to engage and retain links on opposite ends of a tire chain, at least one of said hooks being slidably carried by said elongated member and being movable away from the other to open said loop and permit insertion thereinto of said links, and means for urging said slidable hook against the other of said hooks for retaining said hooks in closed loop-forming position.

THOMAS C. REESE.